United States Patent
Behles et al.

(10) Patent No.: US 10,069,954 B2
(45) Date of Patent: Sep. 4, 2018

(54) AUDIO DEVICE WITH A STIFFENING STRUCTURE

(71) Applicant: Nokia Corporation, Espoo (FI)

(72) Inventors: Thorsten Behles, Tampere (FI); Pasi Tuomo Antero Kemppinen, Tampere (FI); Mikko T. Jyrkinen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 253 days.

(21) Appl. No.: 14/326,699

(22) Filed: Jul. 9, 2014

(65) Prior Publication Data

US 2016/0014247 A1 Jan. 14, 2016

(51) Int. Cl.
*H04M 1/03* (2006.01)
*H04M 1/02* (2006.01)
*H04R 17/00* (2006.01)

(52) U.S. Cl.
CPC .......... *H04M 1/035* (2013.01); *H04R 17/005* (2013.01); *H04M 1/0249* (2013.01); *H04R 2499/11* (2013.01)

(58) Field of Classification Search
CPC ...... H04M 1/0202; H04M 1/035; H04M 1/03; H04M 1/0249; H04M 1/0252; G02F 1/133308; G06F 1/1626; H04R 1/02; H04R 17/00; H04R 7/16; H05K 9/0037; B23C 5/003; A61C 7/00
See application file for complete search history.

(56) References Cited

U.S. PATENT DOCUMENTS

| | | | | |
|---|---|---|---|---|
| 4,173,266 A | * | 11/1979 | Pizer | H04R 1/2865 181/144 |
| 7,711,131 B2 | * | 5/2010 | Furuya | H04M 1/035 381/182 |
| 8,682,396 B2 | * | 3/2014 | Yang | B06B 1/045 310/12.04 |
| 8,774,876 B2 | * | 7/2014 | Ozasa | H04M 1/0266 345/156 |
| 8,837,763 B1 | * | 9/2014 | Millen | H04R 1/2834 181/145 |
| 2001/0017924 A1 | | 8/2001 | Azima et al. | 381/165 |
| 2001/0028716 A1 | | 10/2001 | Hill et al. | 381/58 |
| 2002/0118847 A1 | | 8/2002 | Kam | 381/111 |
| 2003/0016519 A1 | * | 1/2003 | Bachman | H05K 9/003 361/818 |
| 2006/0153417 A1 | * | 7/2006 | Furuya | H04M 1/035 381/396 |
| 2006/0171107 A1 | * | 8/2006 | Yamamoto | G02F 1/133308 361/679.21 |

(Continued)

FOREIGN PATENT DOCUMENTS

WO WO-2012/025783 A1 3/2012
WO WO-2012/052803 A1 4/2012
(Continued)

*Primary Examiner* — Angelica M McKinney
(74) *Attorney, Agent, or Firm* — Harrington & Smith

(57) ABSTRACT

An apparatus includes a first portion configured to carry one or more components of the apparatus and at least one wall extending between two or more sides of the first portion; an actuator located in the first portion adjacent to the at least one wall; and a movable section on the first portion and configured to be actuated by the actuator. At least the first portion and the movable section define a speaker.

17 Claims, 18 Drawing Sheets

(56) References Cited

U.S. PATENT DOCUMENTS

| | | | |
|---|---|---|---|
| 2006/0181522 A1 | 8/2006 | Nishimura et al. | 345/177 |
| 2007/0256888 A1* | 11/2007 | Plummer | H04R 1/2857 |
| | | | 181/199 |
| 2008/0100568 A1* | 5/2008 | Koch | G06F 3/016 |
| | | | 345/156 |
| 2009/0305184 A1* | 12/2009 | Ting | A61C 7/00 |
| | | | 433/24 |
| 2010/0061040 A1* | 3/2010 | Dabov | G06F 1/1626 |
| | | | 361/679.01 |
| 2013/0335211 A1* | 12/2013 | Kobayashi | G06F 1/1626 |
| | | | 340/407.2 |
| 2014/0027317 A1* | 1/2014 | Rayner | G06F 1/1626 |
| | | | 206/37 |
| 2014/0069736 A1* | 3/2014 | Freshman | H04M 1/0202 |
| | | | 181/182 |

FOREIGN PATENT DOCUMENTS

| WO | WO-2012090031 A1 | 7/2012 |
|---|---|---|
| WO | WO-2012/111348 A1 | 8/2012 |

\* cited by examiner

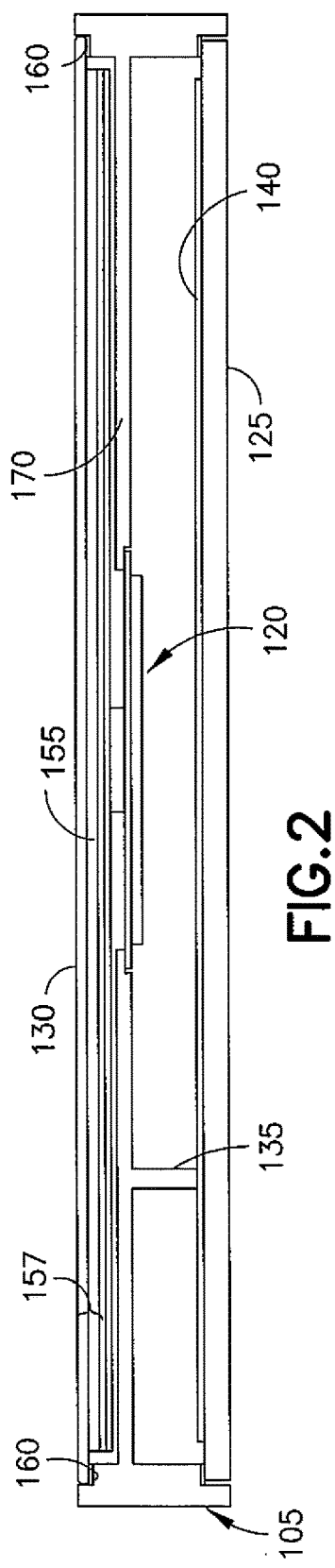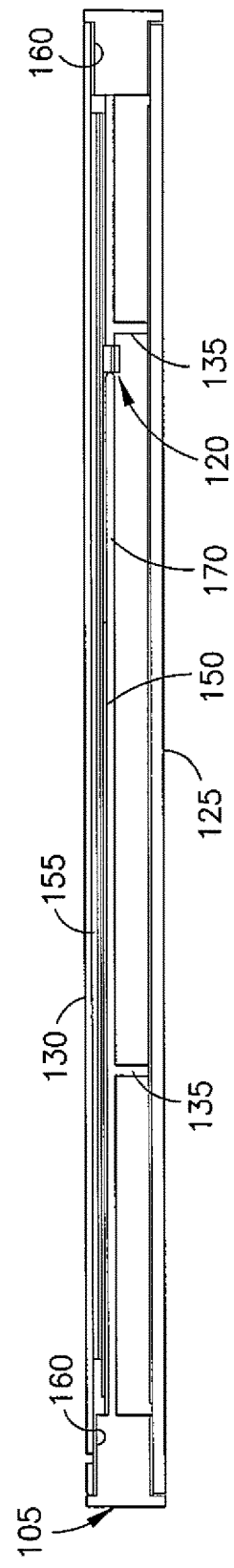
FIG.2
FIG.3

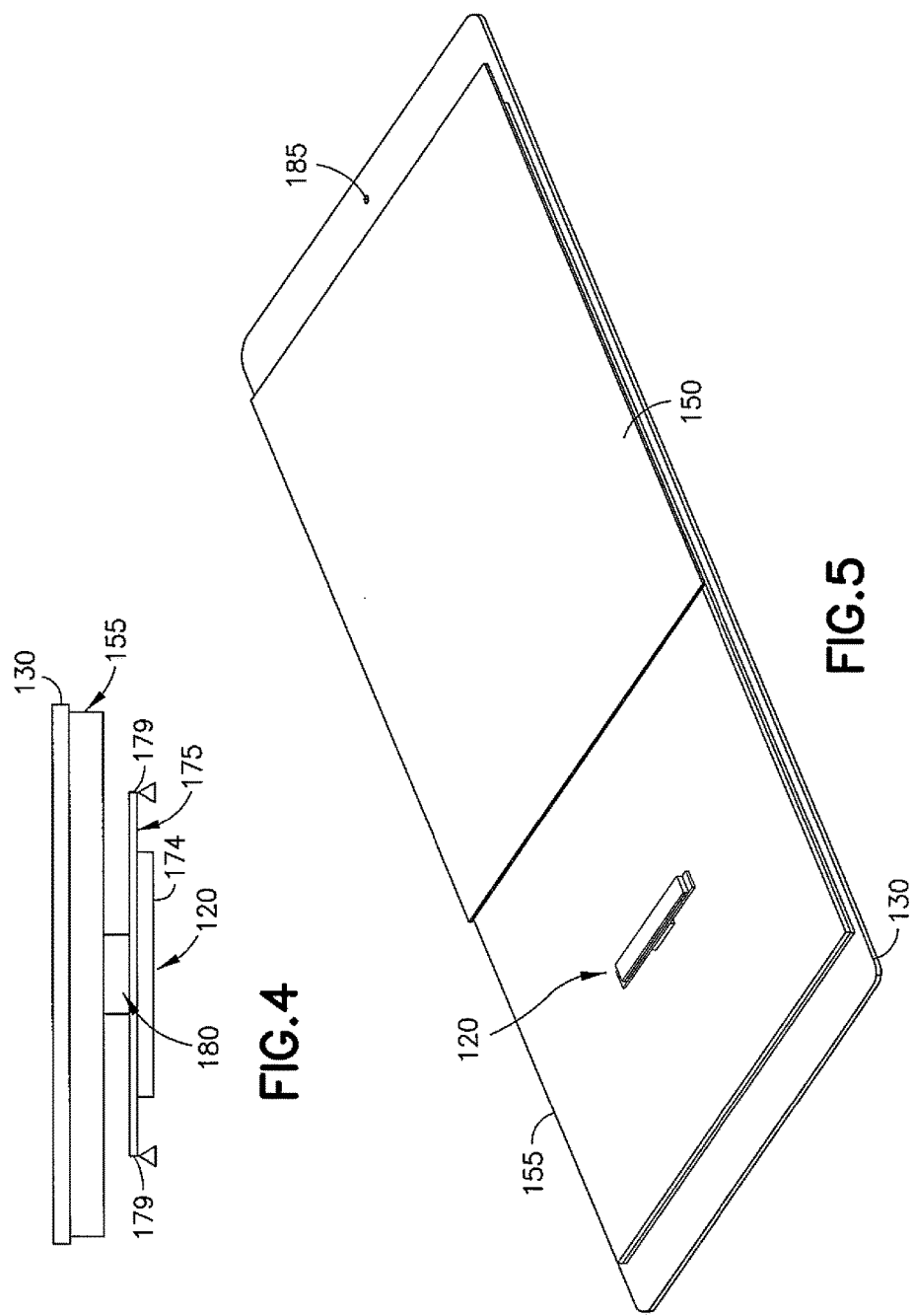

AUDIO DEVICE WITH A STIFFENING STRUCTURE

BACKGROUND

Technical Field

The exemplary and non-limiting embodiments disclosed herein relate generally to audio devices and, more particularly, to mobile devices having panel speakers that incorporate stiffening structures to improve acoustic performance.

Brief Description of Prior Developments

Mobile devices such as phones generally include earpieces that employ conventional speaker technology to enable a user to listen to a downlink signal. In a phone employing conventional speaker technology, audio signals are emitted from a device located internally in the phone, through a hole, and directly into the user's ear.

Some mobile phone manufacturers produce phones that employ panel speakers behind a front display through which the user interacts with the phone. The phones that incorporate such panel speakers are narrow band devices that generally do not provide wide band call quality audio signals as output. Furthermore, an upper portion of the front display often forms a "dead band" that does not provide any audio signal output.

SUMMARY

The following summary is merely intended to be exemplary. The summary is not intended to limit the scope of the claims.

In accordance with one aspect, an apparatus comprises a first portion configured to carry one or more components of the apparatus and at least one wall extending between two or more sides of the first portion; an actuator located in the first portion adjacent to the at least one wall; and a movable section configured to be actuated by the actuator. At least the first portion and the movable section define a speaker.

In accordance with another aspect, a method comprises inputting data into a movable section of a mobile device; causing the operation of a controller having a memory and a processor; communicating with a means for receiving a downlink audio signal; and providing the downlink audio signal through a first portion carrying one or more components and at least one wall extending between two or more sides of the first portion.

In accordance with another aspect, a non-transitory computer readable storage medium comprises one or more sequences of one or more instructions which, when executed by one or more processors of an apparatus, causes the apparatus to at least: communicate with a means for receiving a downlink audio signal; and provide the downlink audio signal through a first portion carrying one or more components and at least one wall extending between two or more sides of the first portion to a user.

BRIEF DESCRIPTION OF THE DRAWINGS

The foregoing aspects and other features are explained in the following description, taken in connection with the accompanying drawings, wherein:

FIG. 2 is a side cross sectional view of the mobile device of FIG. 1 along a Y axis;

FIG. 3 is a side cross sectional view of the mobile device of FIG. 1 along an X axis;

FIG. 4 is schematic representation of a piezoelectric actuator mounted in the mobile device;

FIG. 5 is a perspective view of echo cancellation tape mounted on a display of the mobile device;

DETAILED DESCRIPTION OF EMBODIMENT

Figure 1:
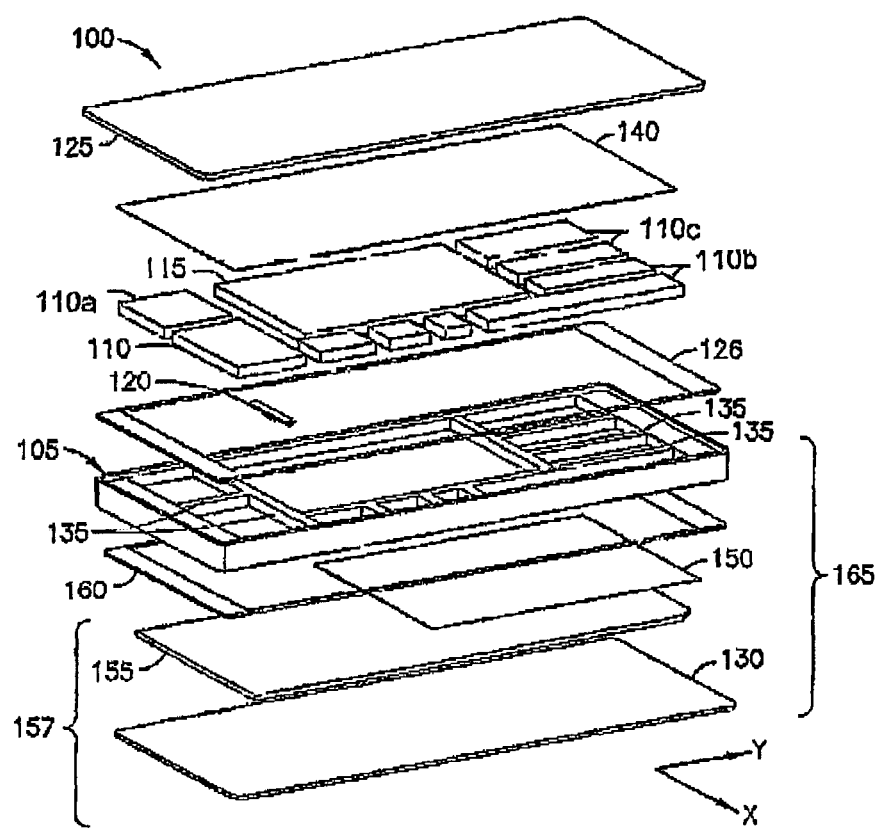
FIG. 1 is an exploded view of one exemplary embodiment of a mobile device incorporating a panel speaker.

The exemplary devices disclosed herein are directed to electronic devices (such as mobile devices) employing earpieces having speakers (e.g., panel speakers) that deliver signals as audio output or audio playback to a user. Although any type of electronic device is within the scope of the disclosed exemplary embodiments, the devices are hereinafter referred to as being mobile phones or phones. In a mobile phone employing a panel speaker, the user can hold the phone such that the earpiece is positioned on or at least adjacent to the user's ear, thereby allowing the user to listen to the downlink audio signal.

When panel speakers are used in mobile phones, the user becomes part of the acoustic system by way of placement of the ear on a vibrating panel. The speakers as disclosed herein employ ribs to create wide band sound outputs as compared to traditional earpiece speaker components and other panel speakers. In doing so, the system defined by the mechanics of the phone (or any other electronic device) can be designed so that improved acoustic output (downlink audio signal performance) is provided to the user.

In the exemplary embodiments described herein, the panel speakers emit sufficient sound pressure at lower frequencies (e.g., below about 1 kilo Hertz (kHz)) to provide suitable audio signals as output. At lower frequencies (which provide the desired wide band frequency responses), the suspension of a movable section (such as a display screen, a display window, a display module, a device cover, or the like) on a chassis is very stiff. Such stiffness is generally desirable because if the user notices that the display moves (due to a flexible suspension) the user's general perception is that the device is defective. However, in the exemplary embodiments of the devices disclosed herein, a flexible suspension may be employed to provide sufficient output audio signals at frequencies of about and less than 1 kHz, the frequency responses being smooth with minimum amounts of peaks and valleys. Furthermore, the exemplary embodiments of the devices disclosed herein are built such that errant audio signal leakage is minimal even though a relatively large portion of the surface of the device is vibrated to operate as the speaker. Leakage of audio signal is kept to a minimum in order to avoid the signal being audible to people in close proximity to the user, which thereby allows the user to maintain privacy. Moreover, the exemplary embodiments of the devices disclosed herein perform such that a microphone of a device does not receive the downlink audio signal from the panel speaker. This eliminates (or at least reduces) any uplink echo issues or double talk that results from vibration. Also, aspects of this invention can be used for flattening the frequency response of audio playback.

Referring to the Figures, exemplary embodiments of mobile phones having panel speakers are shown. Although the features of the mobile phones will be described with reference to the example embodiments shown in the drawings, it should be understood that features can be embodied in many alternate forms. In addition, any suitable size, shape, or type of elements or materials could be used.

Referring to FIG. 1, one exemplary embodiment of a mobile phone having a panel speaker is designated generally at 100 and is hereinafter referred to as "phone 100." Phone 100 comprises a first portion such as a chassis 105 in which is located a plurality of electronic components 110 (e.g., a printed wiring hoard, a controller 110a, processors 110b, memory 110c) including a battery 115 as well as a piezoelectric actuator 120. The electronic components 110, battery 115, and piezoelectric actuator 120 are mounted in the chassis 105. A back cover 125 is located on a back face of the chassis 105 (retained thereon via A hack cover tape 126). A display window or display module 157 defined by a front window 130 positioned over an electronic display 155 (e.g., an organic light emitting diode (OLED) or flexible OLED (POLED) for user interaction) is located on a front face of the phone 100.

The chassis 105 includes one or more walls or ribs 135. The chassis 105 with the ribs 135, in conjunction with at least the display module 157, operates as a panel speaker 165. A damping layer 140 is positioned between the electronic components 110 located in the chassis 105 and the back cover 125. An echo cancellation tape 150 is positioned on an underside of the display 155 facing the chassis 105 so as to be located between the electronic components 110 and the display module 157.

The display module 157 is coupled to the chassis 105 by a connection comprising a suspension 160, which may be a tape positioned under peripheral edges of the front window 130. This coupling provides a less visible connection of the display module 157 to the chassis 105. The electronic display 155 is suspension-mounted to the chassis 105 via the front window 130 and the suspension 160. However, the suspension 160 could be provided directly between the chassis 105 and the display 155. The suspension 160 may comprise, for example, microcellular urethane foam such as PORON (available from Rogers Corporation, located in Rogers, Conn., USA). Thickness of the soft suspension 160 may be, for example, 0.3 millimeters (mm), with adhesive on both sides thereof for fixing the suspension 160 in place. Alternative materials include, but are not limited to, thermoplastic elastomer, thermoplastic polyurethane, silicone, rubber, and combinations of the foregoing materials. A pressure sensitive adhesive (PSA), liquid glue, or hot melt glue may be used to fix the suspension 160 in place.

Referring to FIGS. 2 and 3, the chassis 105 includes a shield plate 170 integrally formed therewith and extending over a face of the chassis 105. The shield plate 170 separates and shields the display 155 from the electronic components 110 and the battery 115. As shown, the shield plate 170 is located closer to the display module 157 and includes an opening in which the piezoelectric actuator 120 is mounted. The piezoelectric actuator 120 urges the display 155 away from chassis 105 and against the front window 130. Due to the positioning of the piezoelectric actuator 120 in the shield plate 170, the impulse from the piezoelectric actuator 120 is directed toward the front of the phone 100.

Referring to FIG. 4, the piezoelectric actuator 120 may be a uni-morph piezoelectric actuator element defined by an active layer 174 and an inactive metal plate 175. The exemplary devices described herein are not limited to uni-morph piezoelectric actuators, as any type of piezoelectric actuator may be employed (e.g., discs, bender-types, or direct-drive ceramic-types (a piezoelectric bender structurally supported at the ends thereof with a connecting piece between the two ends, the connecting piece configured to route force from the piezoelectric bender into the panel)). Additionally, dynamic voltage-current motors, unbalanced or balanced armatures, or magnetorestrictive drivers could be used. The piezoelectric actuator 120 (or any other type of actuator used) actuates the display window or display module 157. Additionally or alternatively, the piezoelectric actuator 120 may actuate the front window 130, the back cover 125, or any other section of the phone 100 that forms the panel speaker 165. In other words, the panel speaker 165 is formed by a section of the phone 100 such as the display 155 (e.g., the display window, the display module 157, cover, or any combination thereof) and defines a movable section that comprises a larger surface than a conventional speaker component, this movable section being suitably actuated by the piezoelectric actuator 120 (or other actuator).

In the piezoelectric actuator as shown, opposing ends 179 of the metal plate 175 are coupled to opposing edges of an opening (shown at 190 in FIG. 6) in the shield plate 170. A connecting pad 180 fabricated from, for example, firm foam is positioned between the metal plate 175 and the display 155. The active layer 174 is configured to generate a force of about 0.2 Newtons (N) to about 1 N, with a substantial portion of such force being directed into the display 155 to make the display 155 move or vibrate (which is beneficial for low frequency sound reproduction), thereby transferring the audio signal output through the display 155 to the user. In the exemplary embodiment shown, a sound pressure level (SPL) (below 1 kHz) of about 40 to 50 dB (unequalized) can be obtained.

Referring to FIG. 5, the echo cancellation tape 150 is positioned on the display 155 between the piezoelectric actuator 120 and an end of the phone 100 which contains a microphone hole 185 located in the front window 130. As shown, the echo cancellation tape 150 extends substantially over the entire width of the display 155 and beyond an edge of the display 155 in the direction of the microphone hole 185.

Figure 6:
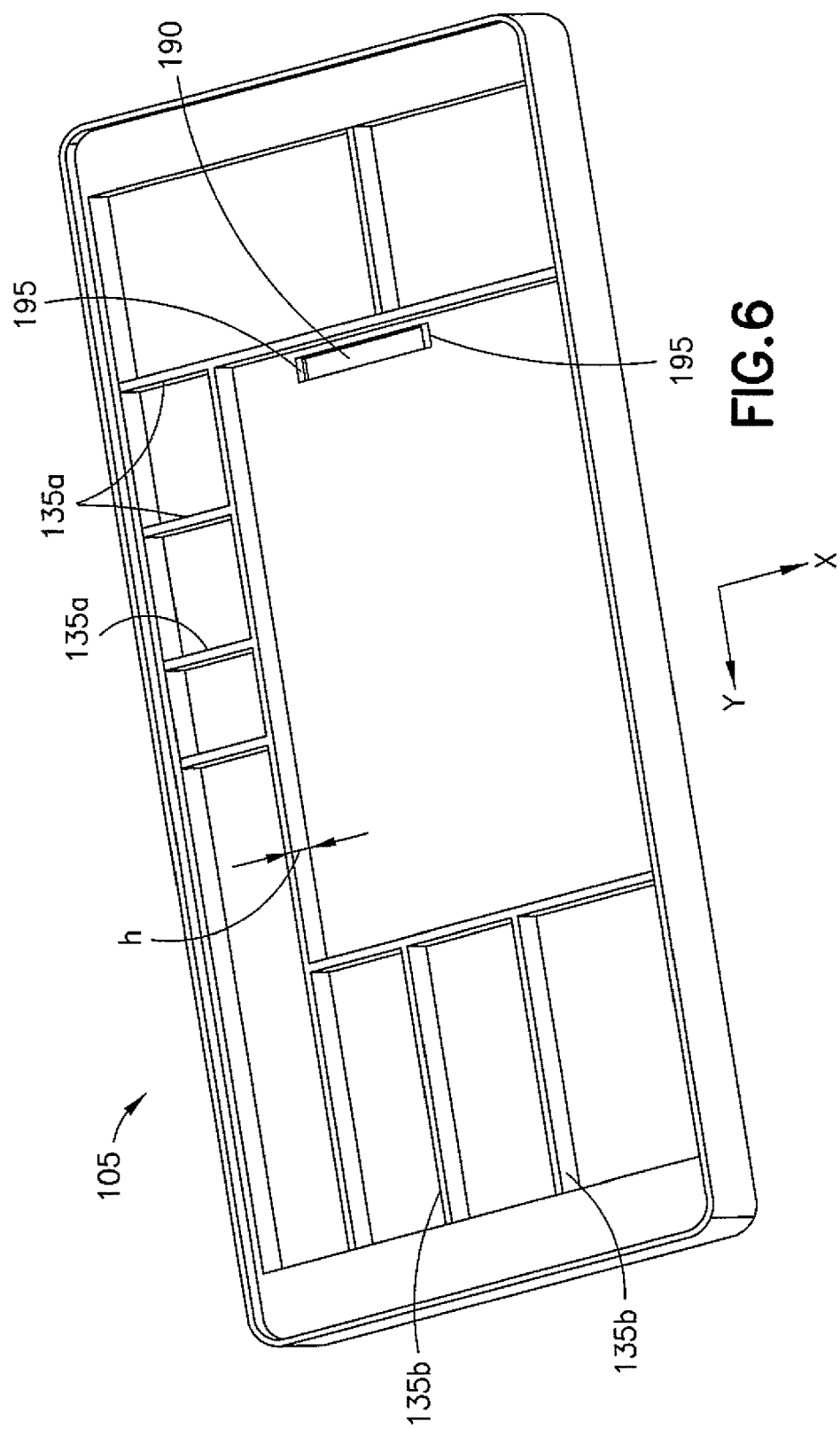
FIG. 6 is a perspective view of a chassis of the mobile device.

Referring now to FIG. 6, the chassis 105 is stiff and substantially rigid in order to facilitate the low frequency sound reproduction. The chassis 105 includes the ribs 135 positioned to accommodate the electronic components 110 and the battery 115. The ribs 135 are generally about 1 mm wide although they may be about 0.5 mm wide to about 3 mm wide. The shield plate 170 includes the opening 190 in which the piezoelectric actuator 120 is mounted, opposing edges of the opening 190 having recessed surfaces 195 on which the piezoelectric actuator 120 can be located. The chassis 105 is fabricated from aluminum, aluminum alloy, stainless steel, magnesium, magnesium alloy, titanium, titanium alloy, ceramic, carbon fiber composites, or similar materials.

The ribs 135 contribute to the stiffening and rigidity of the chassis 105 and the overall construction of the phone 100. More specifically, one or more walls or ribs 135a extend in the X direction (with regard to the chassis 105) and one or more walls or ribs 135b extend in the Y direction. The positioning of the ribs 135 in the chassis 105 also directs audio signals within the body of the phone 100, thereby contributing to the flattening of the frequency response from the panel speaker 165, which in turn facilitates the low frequency sound reproduction. The stiffness of the construction based on the positioning of the ribs 135 and the material from which the chassis 105 is fabricated in combination with echo cancellation (e.g., from the echo cancellation tape 150) is also beneficial for addressing challenges with regard to uplink echo.

The height h of the ribs 135 should be as great as possible without touching the back cover 125, thereby defining a space between the top edges of the ribs 135 and an inner surface of the back cover 125. The height h can also be adjusted (and may be variable throughout the phone 100) to alter the qualities and/or volume of audio signal output. For example, defining a space between the top surfaces of the ribs 135 and the back cover 125 allows the audio signal output to be minimized with regard to errant audio signals, which in turn allows the user to maintain at least some privacy. As shown, the height h of the ribs 135 is about 3 mm, although the height h may be about 0.1 mm to about 13 mm (e.g., the full thickness of the phone 100. The ribs 135 (as well as the shield plate 170) may also vary in thickness or include recesses to effect the stiffness of the chassis 105.

The ribs 135 are further configured to route force vibrations within the chassis 105. This helps to minimize sound emitted from the back of the phone 100.

The ribs 135a and 135b are configured to accommodate the electronic components 110 and the battery 115. The battery 115 is adhesively coupled to the shield plate 170. In some exemplary embodiments, the battery 115 is coupled to the shield plate 170 using a PSA in the form of a tape. The PSA (and also mass added by the PSA) provides a sound damping effect within the compartment defined by the ribs 135a and 135b around the battery. Since the battery 115 is generally fabricated of a polymer (e.g., a lithium-based polymer), the polymer itself provides some sound damping effect for at least some frequencies. In some exemplary embodiments, the battery 115 is encased in an aluminum shell, which (in addition to the ribs 135a and 135b) provides stiffening to the chassis 105.

If the ribs 135 are sized and positioned in relation to the piezoelectric actuator 120, the frequency response can be flattened (thereby resulting in less distortion of the downlink audio signal and easier tuning of the entire system). The ribs 135 can also be sized and positioned so that certain kinds of resonant modes do not occur or are shifted to other frequencies, thereby resulting in the frequency response being as flat, distortion-free, and controllable as possible.

Figure 7:
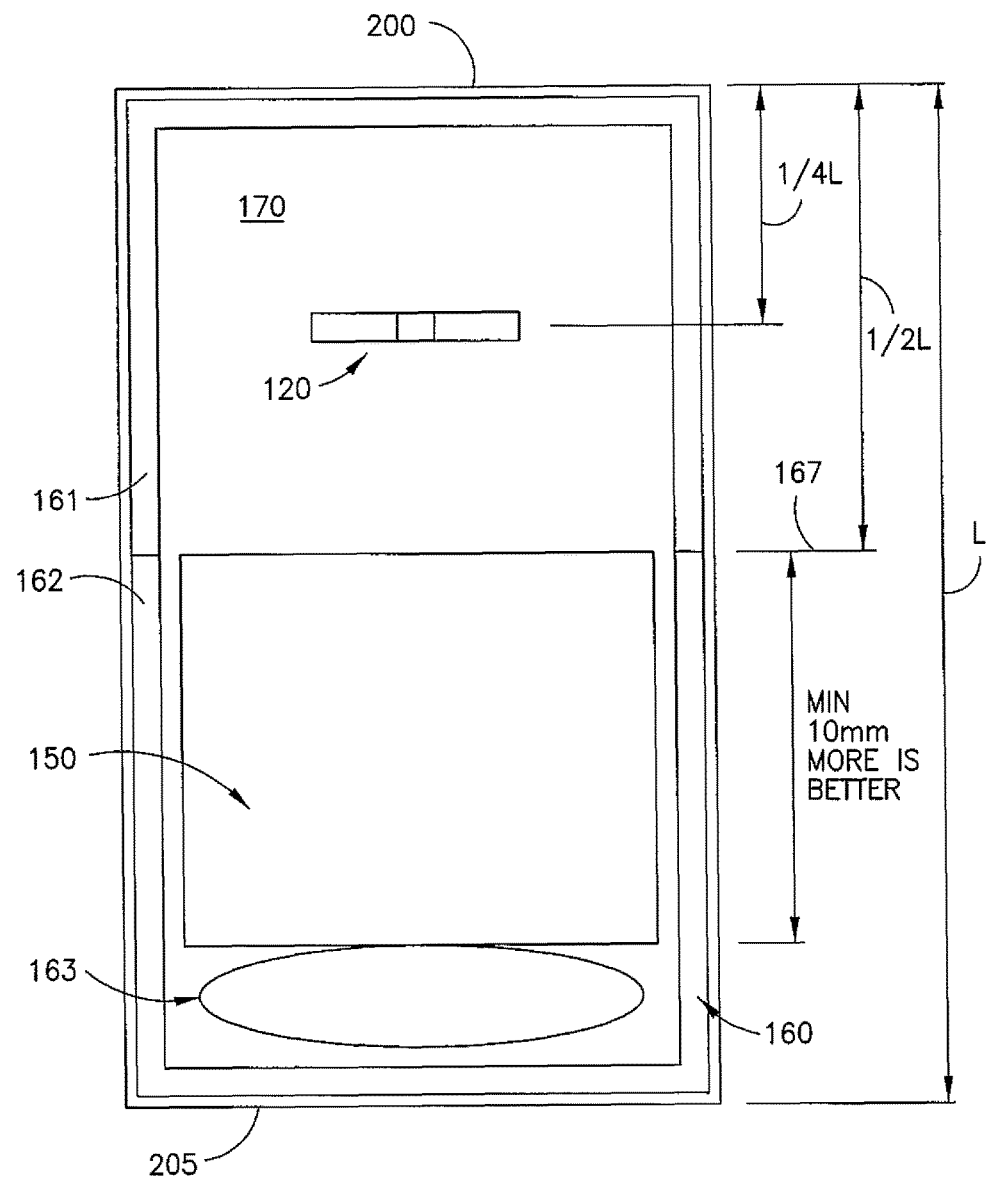
FIG. 7 is a schematic representation of one exemplary embodiment of a layout of some components in the mobile device.

Referring to FIG. 7, the positioning and construction of the ribs 135 is based on the positioning of the piezoelectric actuator 120. In the exemplary embodiments disclosed herein, the piezoelectric actuator 120 is positioned in the shield plate 170 so as to be substantially centrally located in an upper half of the phone 100 under the display 155. The layout should be symmetrical with the piezoelectric actuator 120 in the center of the upper half of the phone 100 (¼ the distance from a top edge 200 and centered across the width) to enhance the sensitivity of the piezoelectric actuator 120, thereby providing for better reproduction of audio signal output of lower frequencies.

Figure 8:
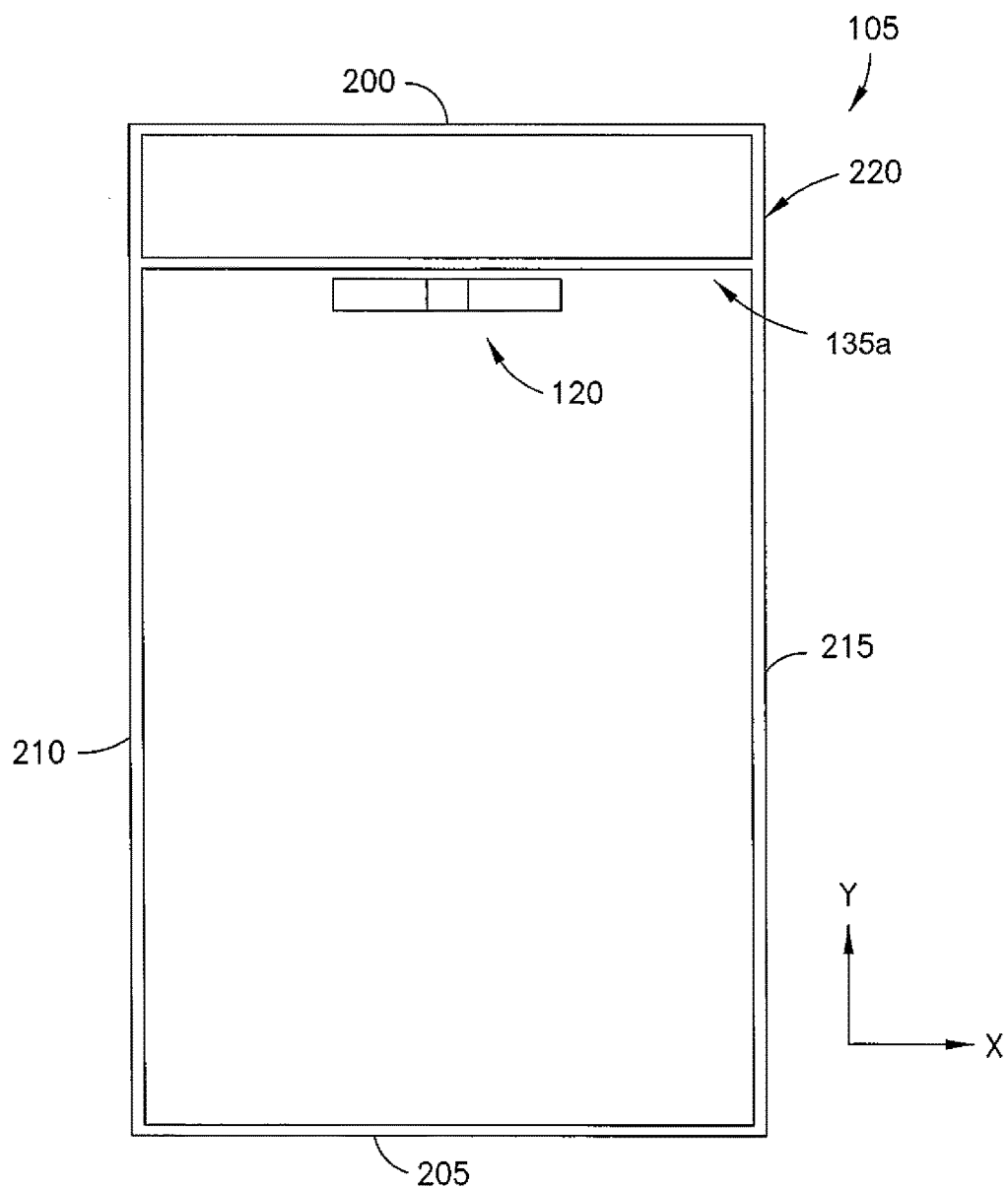
FIG. 8 is a schematic representation of one exemplary embodiment of a rib layout in an X direction in the mobile device.

Referring to FIG. 8, outer sides of the chassis 105 comprise elongated members configured to define the top edge 200, a bottom edge 205, a first side edge 210, and a second side edge 215, each arranged relative to the others to define a rectangular outer frame structure 220. Each of the corners of the outer frame structure 220 need not be angular, as shown, and instead may be defined by a radius. A first rib 135a extending in the X direction in a straight line from the first side edge 210 to the second side edge 215 is located adjacent to and as close as possible to an edge of the piezoelectric actuator 120 that faces the top edge 200 (with the piezoelectric actuator 120 or a space therefor being centrally located in the upper half of the phone 100, as described herein). The position of this first rib 135a may correlate with the size of the battery 115 and further with the positioning of any accessory devices in the phone 100 (e.g., a camera or the like). The exemplary embodiments as disclosed herein are not limited to the incorporation of one first rib 135a, as additional ribs extending in the X direction may be employed (as shown in at least FIG. 6).

The first rib 135a improves the low frequency response of the audio signal output. Without the first rib 135a and with the piezoelectric actuator 120 simply fixed onto the shield plate 170, the shield plate 170 may bend under the load of the piezoelectric actuator 120 urged against the display 155, and force may not be transferred in the direction of the display module 157. Also, the chassis 105 may deform and amplify the force of the piezoelectric actuator 120 against the display module 157.

The first rib 135a further improves the durability of the phone 100 if dropped, reduces the radiation of sound into the back cover particularly at frequencies below about 1 kHz, and (assuming the phone 100 has a display 155 that is about 5 inches long when measured from opposite corners) helps to smooth frequency responses of the downlink audio signals at frequencies of about 4 kHz through the panel speaker 165. Additionally, since the frequency response can be varied in phones having chasses fabricated from polymer, the first rib 135a also strengthens the phone 100 in the X direction across the chassis 105 (which is fabricated from metal) and inhibits variation of frequency response due to grasping by the user.

Figure 9A:
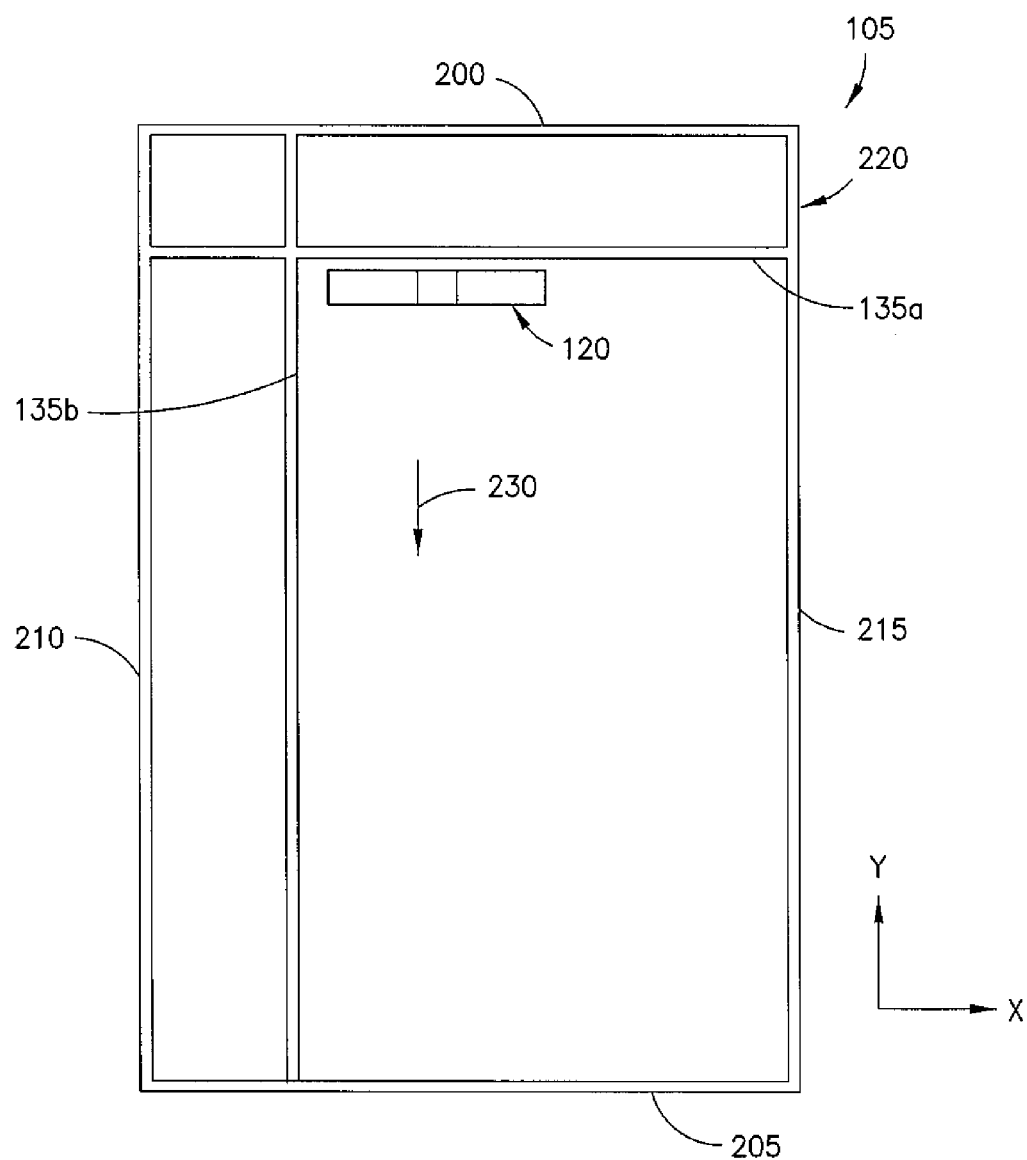
FIG. 9A is a schematic representation of one exemplary embodiment of a rib layout in X and Y directions in the mobile device.
Figure 9B:
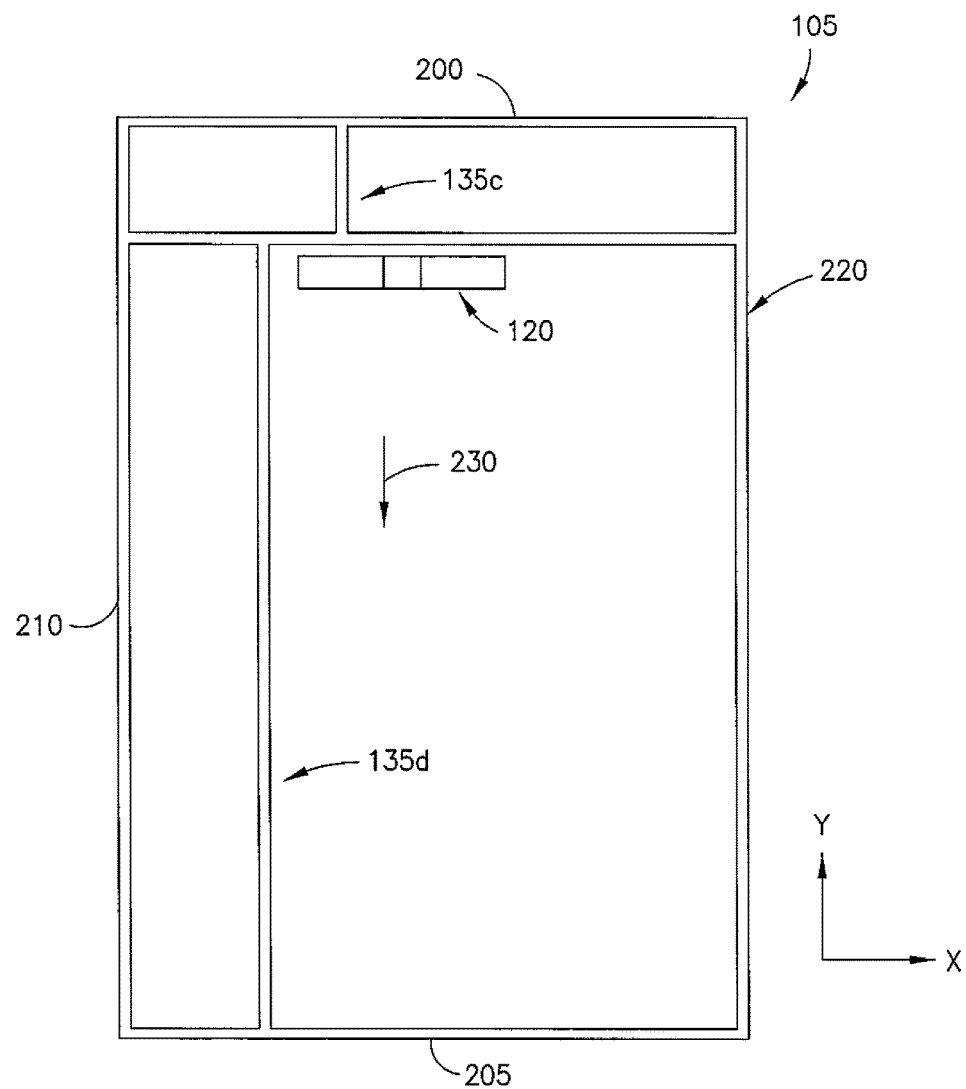
FIG. 9B is a schematic representation of another exemplary embodiment of a rib layout in X and Y directions in the mobile device.

Referring to FIGS. 9A and 9B, a second rib 135b extends in the Y direction in a straight line from the top edge 200 to the bottom edge 205 (FIG. 9A). The second rib 135b crosses the first rib 135a as close as possible to the piezoelectric actuator 120 in order to create a stiff mechanical structure. In the event the second rib 135b cannot extend in a straight line from the top edge 200 to the bottom edge 205 (for example, due to the size and positioning of the electronic components 110 and/or battery 115), the second rib 135*b* may comprise an upper second rib portion 135*c* and a lower second rib portion 135*d* that are not aligned, as shown in FIG. 9B.

Still referring to FIGS. 9A and 9B, the second rib 135*b* (or the upper second rib portion 135*c* and the lower second rib portion 135*d*) provides stiffness to the phone 100, which inhibits resonance in the chassis 105 and improves the frequency responses at frequencies of greater than about 3.5 kHz. The stiffness further assists in attenuating the vibrations of the display 155 in the lower half of the phone 100 (in conjunction with the echo cancellation tape 150). The exemplary embodiments as disclosed herein are not limited to the incorporation of one or two second ribs 135*b*, as additional ribs extending in the Y direction may be employed (as shown in at least FIG. 6).

In some exemplary embodiments the piezoelectric actuator 120 may be positioned closer to the geometric center of the phone 100, in a direction indicated by an arrow 230. As the piezoelectric actuator 120 is moved in the direction of the arrow 230, the construction of the second rib 135*b* should become correspondingly stiffer to avoid the phone 100 flexing along the Y axis, thereby causing extra modes to resonate, which may result in non-flat frequency responses. Furthermore, as the piezoelectric actuator 120 is positioned closer to the geometric center of the phone 100, sound is more easily radiated from the back cover 125, which detrimentally affects user privacy.

Referring back to FIG. 7, the echo cancellation tape 150 extends from halfway between the top edge 200 and bottom edge 205 at least 10 mm in the direction of the bottom edge 205. As much echo cancellation tape 150 should be used as possible. However, a portion of the surface of the display 155 should not include the echo cancellation tape 150 and should instead remain a free space (area 163) for display of data and user interaction with the phone 100, as described below.

The echo cancellation tape 150 may comprise, for example, PSA tape or firm foam (such as PORON for example). The PSA tape is also known as an adhesive tape, self-stick tape, sticky tape, or just tape, and is an adhesive tape that will stick with application pressure, without the need for solvent, heat, or water for activation. The tape consists of a pressure-sensitive adhesive coated onto a backing material such as paper, plastic film, cloth, or metal foil. Single-sided tapes allow bonding to a surface or joining of two adjacent or overlapping materials. Double-sided tape (adhesive on both sides) allows joining of two items back-to-back.

The echo cancellation tape 150 is provided between a portion of the chassis 105 and the rear side of the display 155. The echo cancellation tape 150 is provided to help with echo cancellation as further described below. The echo cancellation tape 150 may be fixedly attached to the rear side of the electronic display 155 and/or to the front side of the shield plate 170. More than one echo cancellation tape 150 may be provided. The echo cancellation tape 150 will help to improve the low frequency output and reduce coupling of the microphone with the panel speaker 165. In one example embodiment, the tape works best if the material of the chassis 105 is metal, such as aluminum for example. The stiffer the chassis material, the better the echo cancellation tape 150 will work. This might not work as well for a plastic chassis made out of PC ABS, for example. It might work for glass fiber reinforced material, but the stiffer the chassis 105 is, the better.

In this example, the echo cancellation tape 150 is PSA tape attached to the rear side of the display 155. In an alternate example, the echo cancellation tape 150 may be attached to the shield plate 170 by the adhesive or both the shield plate 170 and the rear side of the display 155 such as with double sided PSA tape for example. More than one echo cancellation tape could be provided in this area. If multiple echo cancellation tapes are used, the tapes may be stacked relative to one another, interleaved relative to one another, and/or located side-by-side relative to one another. In OLED-based devices, thin foam tapes are usually behind or on the back side of the OLED to help the OLED to survive a drop. Such tapes are usually not touching or in compression with the chassis 105. In this case, the tapes may be stacked and the echo cancellation tape 150 would be under compression so that it attenuates the vibrations. The upper part with the other OLED tape would be not in contact in an ideal case or with very little to no contact. In this example, the echo cancellation tape 150 is located at the lower half of the display module 157.

In the exemplary embodiments shown, the echo cancellation tape 150 extends across a majority of a width of the display module 157 for about 90 percent or more of the lower half of the at least one vibration damping member, but could be as little as 10 percent or more of the lower half of the display module 157. The echo cancellation tape 150 is located against a majority of the lower half of the display 155 at the rear side of the display 155. The echo cancellation tape 150 is attached to the rear side of the display 155 by adhesive. The echo cancellation tape 150 does not extend substantially past the lower half of the display module 157 onto a top half of the display module 157.

The echo cancellation tape 150 has a general square or rectangular shape. However, any suitable shape could be provided. The shape of the echo cancellation tape 150 (such as the foam pad/tape described above, for example) may be important in regard to the damping characteristics. For example, the edge of the echo cancellation tape 150 facing towards the piezoelectric actuator 120 may be designed by gradually changing the shape for damping (reducing received vibrations caused by the piezoelectric actuator 120). The edge of the echo cancellation tape 150 facing towards the piezoelectric actuator 120 may have a saw-tooth shape for example. The saw-tooth shape may be uniform or non-uniform.

The edge may have one or more sections with a regular or irregular or non-regular pattern. The shape of the edge may be designed based upon the amount of required damping. The shape of the edge facing towards the piezoelectric actuator 120 may be non-uniform and/or non-straight. This non-uniform and/or non-straight shaping may be applied to one or more edges of the foam pad/tape.

The echo cancellation tape 150 may be located in a lower half of a movable section but, more significantly, the echo cancellation tape 150 may be located proximate to the handset microphone, such as in the lower half of the phone 100, for example.

The suspension 160 positioned under the peripheral edges of the display module 157 comprises a softer suspension material around the upper portion of the display 155 and a harder suspension material around the lower portion of the display 155. The suspension materials generally comprise a strip of PSA about 10 mm wide, the strip operating as a damping barrier to reduce vibrations in the display 155 around the microphone hole 185 while providing flexibility to the upper portion of the display 155.

The suspension 160 may be uniform. However, in this example the suspension 160 comprises a first section 161 and a second section 162. The first section 161 is soft relative to the second section 162 and yielding more readily to pressure. The second section 162 is hard relative to the first section 161, yielding less readily to pressure. The soft/hard difference between the two sections 161, 162 may be provided by the material characteristic of the suspension at the first section 161 versus the material characteristic of the suspension at the second section 162. For example, the material at the first section 161 may be more resilient that the material at the second section 162. The cross-sectional shape of the first section 161 may alternatively or additionally be more resilient than the cross sectional shape of the second section 162. The first section 161 of the suspension 160 is soft and the second section 162 of the suspension 160 is harder. The connection may comprise a connection similar to that described in U.S. patent application Ser. No. 14/151,328 which is hereby incorporated by reference in its entirety. In this example, the area 163 is provided as a free space for a display integrated circuit (IC) and a touch integrated circuit (IC). The larger the size of the tape in Y-axis direction, the better the vibration removal before it reaches the microphone. In this example, as the tape gets bigger towards the microphone, starting from almost the mid line 167, then a better performance is achieved.

Figure 10:
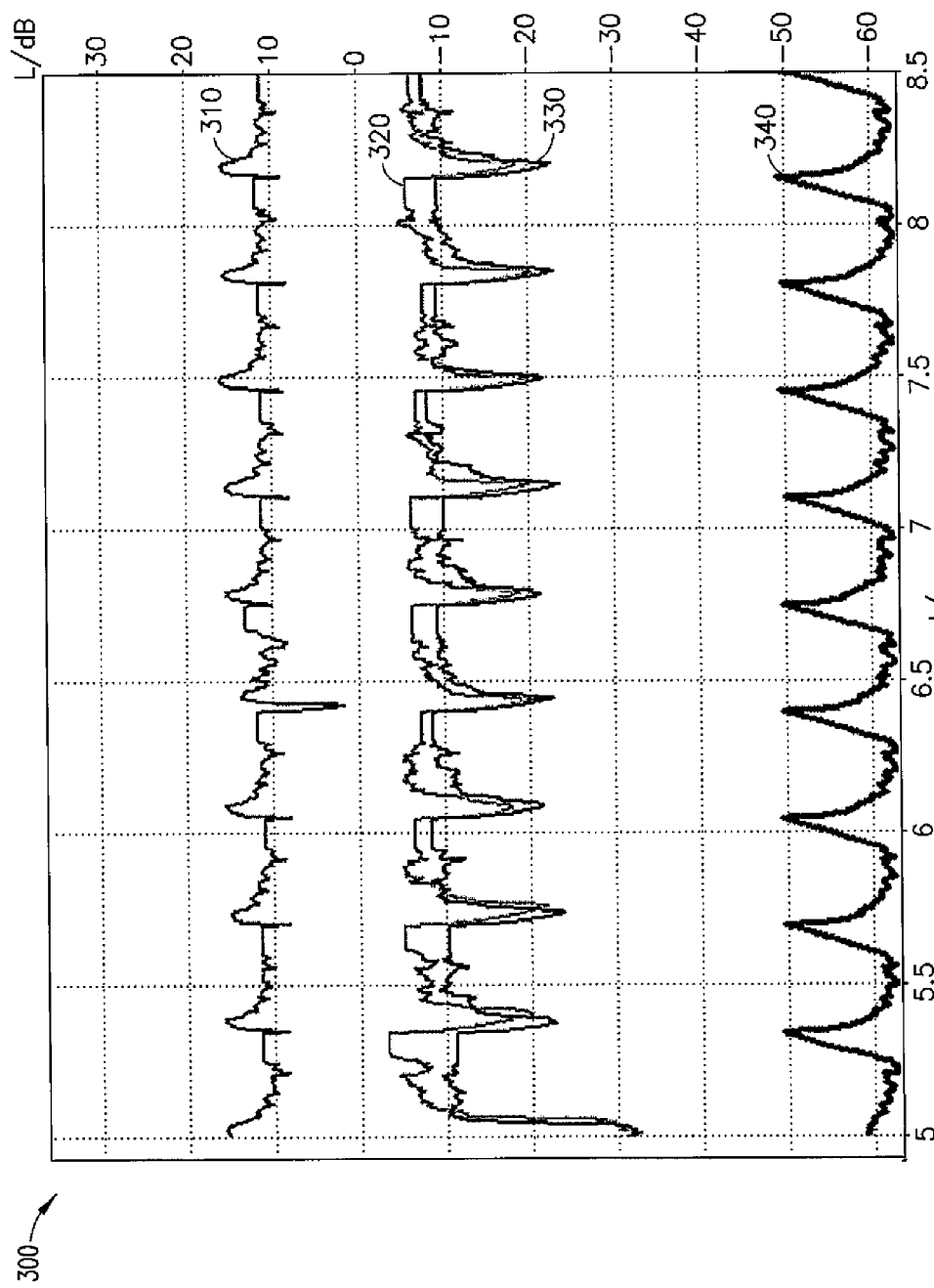
FIG. 10 is a graphical representation of echo levels in various mobile devices.

Referring to FIG. 10, a graph of echo level as a function of time is shown at 300. Graph. 300 compares the phone 100 incorporating the ribs 135 to three similar phones that do not incorporate the rib construction as disclosed herein. Line 310 shows an echo level of about 9 to about 15 sound pressure units (L) in decibels (dB) for a device having an acoustic echo controller (AEC) with background noise suppression (TX-ALWE) and an uplink dynamic range controller OFF. Line 320 shows an echo level of about −18 to about −8 dB for a device having AEC with an adaptive filter (suppressor OFF). Line 330 shows an echo level of about −22 to about −9 dB for a device having AEC with an AFIR (suppressor ON). Line 340 shows an echo level of about −62 to about −50 dB for the phone 100, which incorporates ribs 135. As can be seen from the graph, the echo level of the phone 100 is considerably less than the echo levels of the comparison devices.

Figure 11:
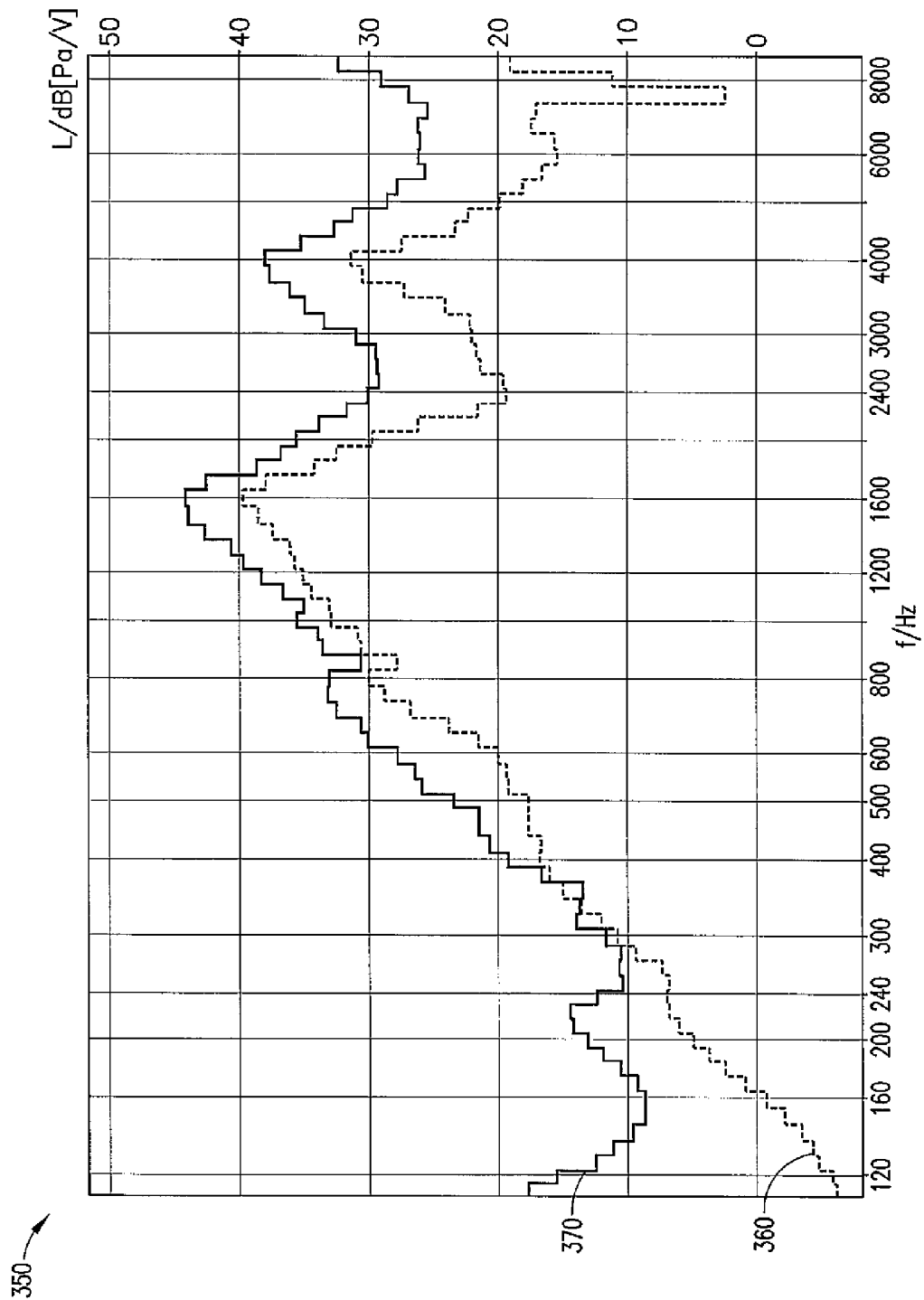
FIG. 11 is a graphical representation of unequalized frequency responses of various mobile devices.

Referring to FIG. 11, a graph of unequalized frequency response in decibels as a function of frequency in Hertz (Hz) is shown at 350. Graph 350 compares the phone 100 incorporating the ribs 135 to a similar phone without the rib construction. Line 360 shows unequalized frequency response for a device having a wide band receiving frequency response (RFR) and a receiving loudness rating (RLR) of −18 dB, and line 370 shows unequalized frequency response for the phone 100 having wide band RFR and an RLR of −23 dB. Graph 350 illustrates the differences in frequency response between a polycarbonate unibody device (line 360) and a metal chassis device, namely, phone 100 (line 370). As can be seen, the metal chassis construction delivers a higher SPL than does the plastic construction. Furthermore, the ribs 135 are determined to obtain higher SPL numbers particularly at lower frequencies of about 200 Hz, which are useful for passing wide band speech mask criteria. Upon manipulation of rib heights and configurations, it is contemplated that the response illustrated by line 370 could be improved further.

Figure 12:
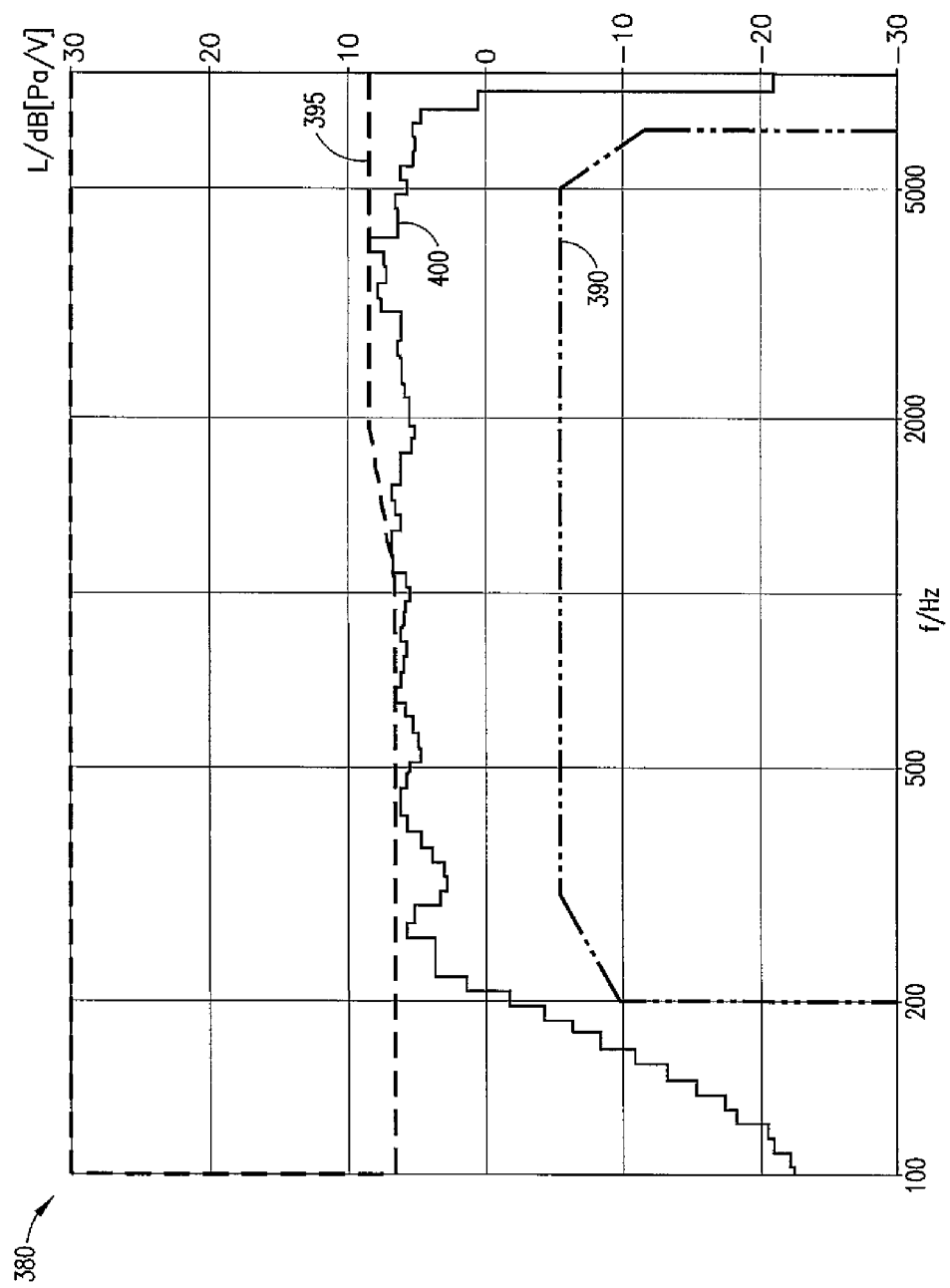
FIG. 12 is a graphical representation of a tuned frequency response of a mobile device having a metal chassis.

Referring to FIG. 12, a graph illustrating the tuned response of the phone 100 is shown at 380. In graph 380, the lower limit of the wide band speech mask is shown by line 390. An upper wide band speech mask limit is shown by line 395. The frequency response of the phone 100 is between the lower limit 390 and the upper limit 395 and is indicated by line 400. Also, the construction defined by the ribs 135 of the metal chassis 105 results in lower frequencies being audible without significant boosting, thereby making distortion control easier for the user.

Figure 13:
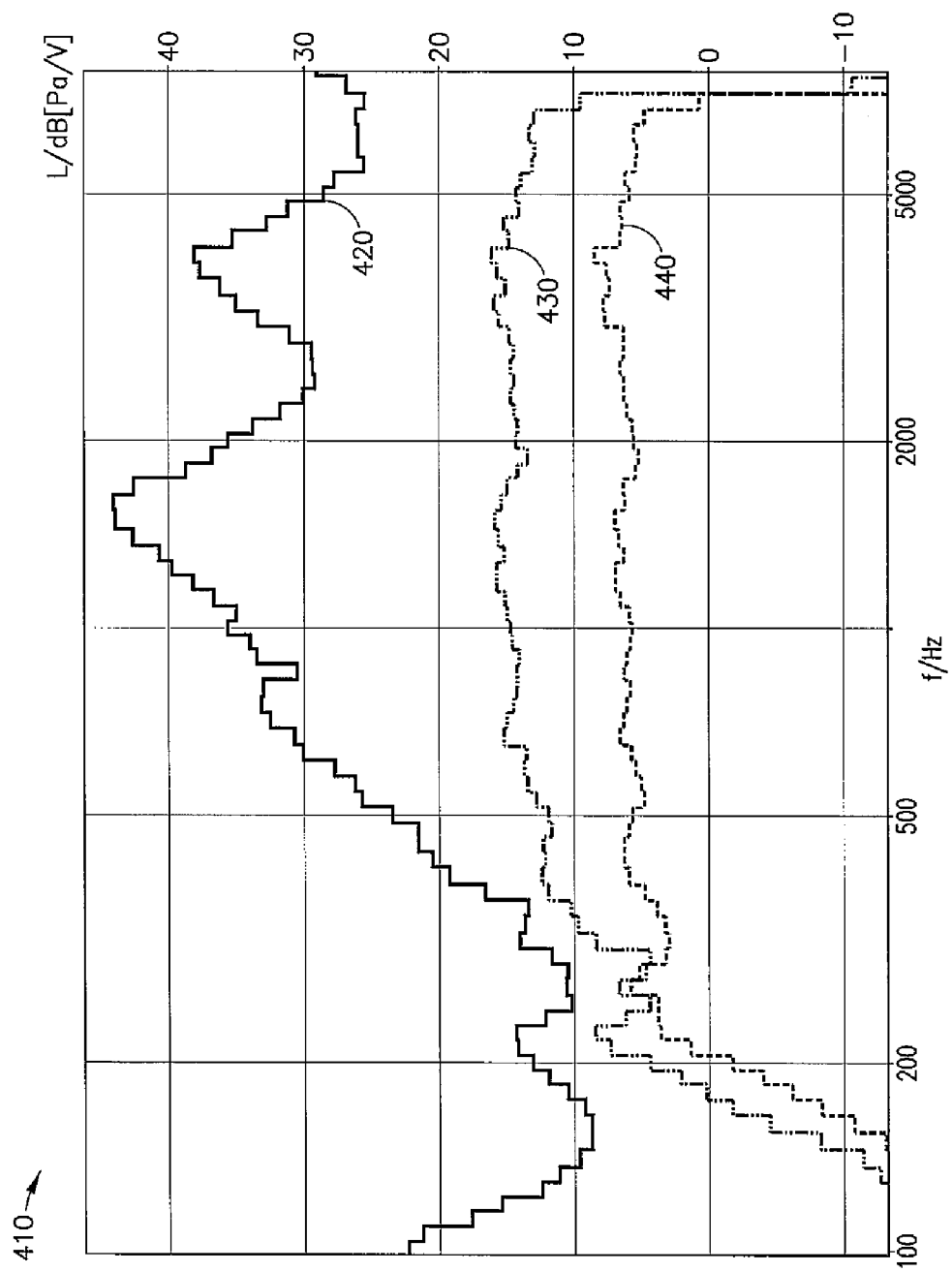
FIG. 13 is a graphical representation of unequalized and equalized wide band receiving frequency responses.

FIG. 13 shows a graph 410 illustrating unequalized and equalized nominal and maximum volumes for the phone 100. In the graph 410, line 420 shows an unequalized wide band RFR as compared to an equalized wide band RFR at maximum volume (line 430) and an equalized wide band RFR at nominal volume (line 440).

Figure 14:
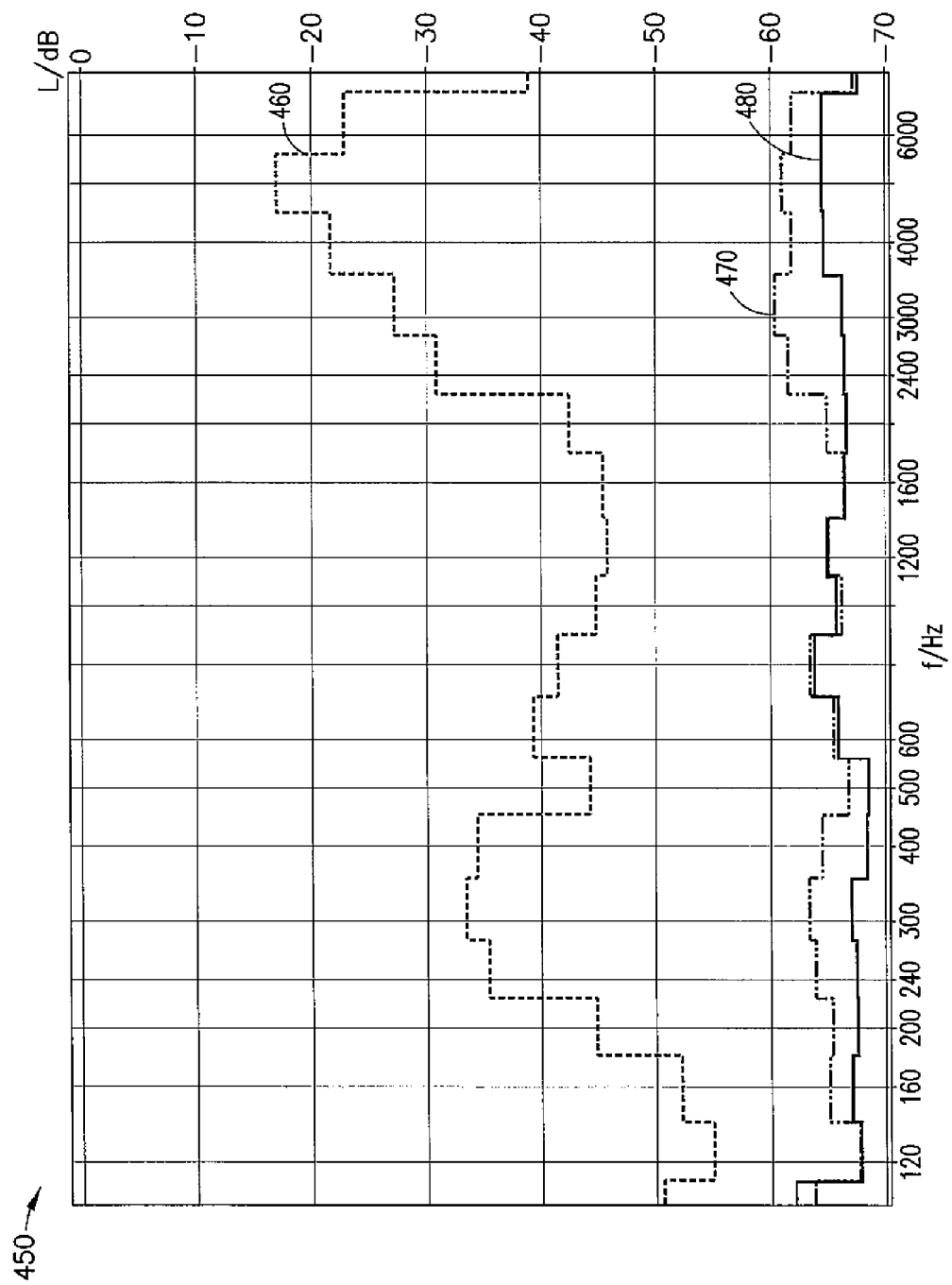
FIG. 14 is a graphical representation of the weighted terminal coupling loss for the mobile device.

Referring to FIG. 14, the weighted terminal coupling loss (TCLw) for the phone 100 is illustrated by a graph 450. Line 460 represents the phone 100 having the acoustic echo controller (AEC) with the background noise suppression (TX-ALWE) and an uplink dynamic range controller OFF, line 470 represents the phone 100 having AEC with an adaptive filter (AFIR) (suppressor OFF), and line 480 represents the phone 100 having the acoustic echo controller (AEC) with the adaptive filter (AFIR) (suppressor ON, 0 weights). Line 480 shows that echo suppression software is able to filter out and suppress the echo to a desirable level. Line 460 indicates that the echo cancellation software is disabled.

Figure 15:
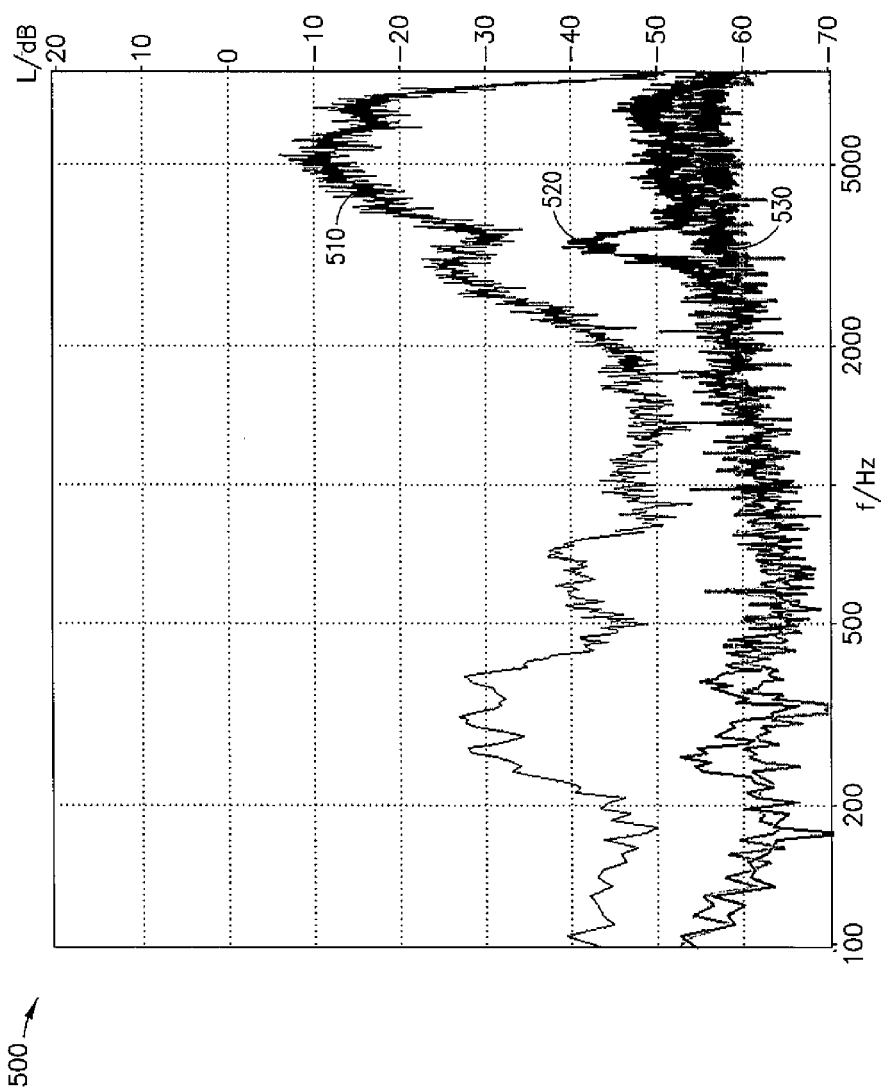
FIG. 15 is a graphical representation of spectral echo attenuation of the mobile device at −16 dBm0 with echo cancellation tape.

Referring to FIG. 15, spectral echo attenuation of the phone 100 at −16 dBm0 (decibels measured at a zero transmission level point) with echo cancellation tape is shown by a graph 500. The coupling is a few dB less as compared to a polycarbonate phone. Line 510 indicates the phone 100 having an acoustic echo controller (AEC) with background noise suppression (TX-ALWE) and an uplink dynamic range controller (UDRC) OFF, line 520 indicates the phone 100 having acoustic echo controller (AEC) with the adaptive filter (AFIR) (suppressor OFF), and line 530 indicates the phone 100 having an acoustic echo controller (AEC) with the adaptive filter (AFIR) (suppressor ON, 0 weights). In example embodiments, improvement is observed at a pre-determined frequency range, such range being applicable in devices other than the exemplary embodiments of the phone 100 as described herein.

Figure 16:
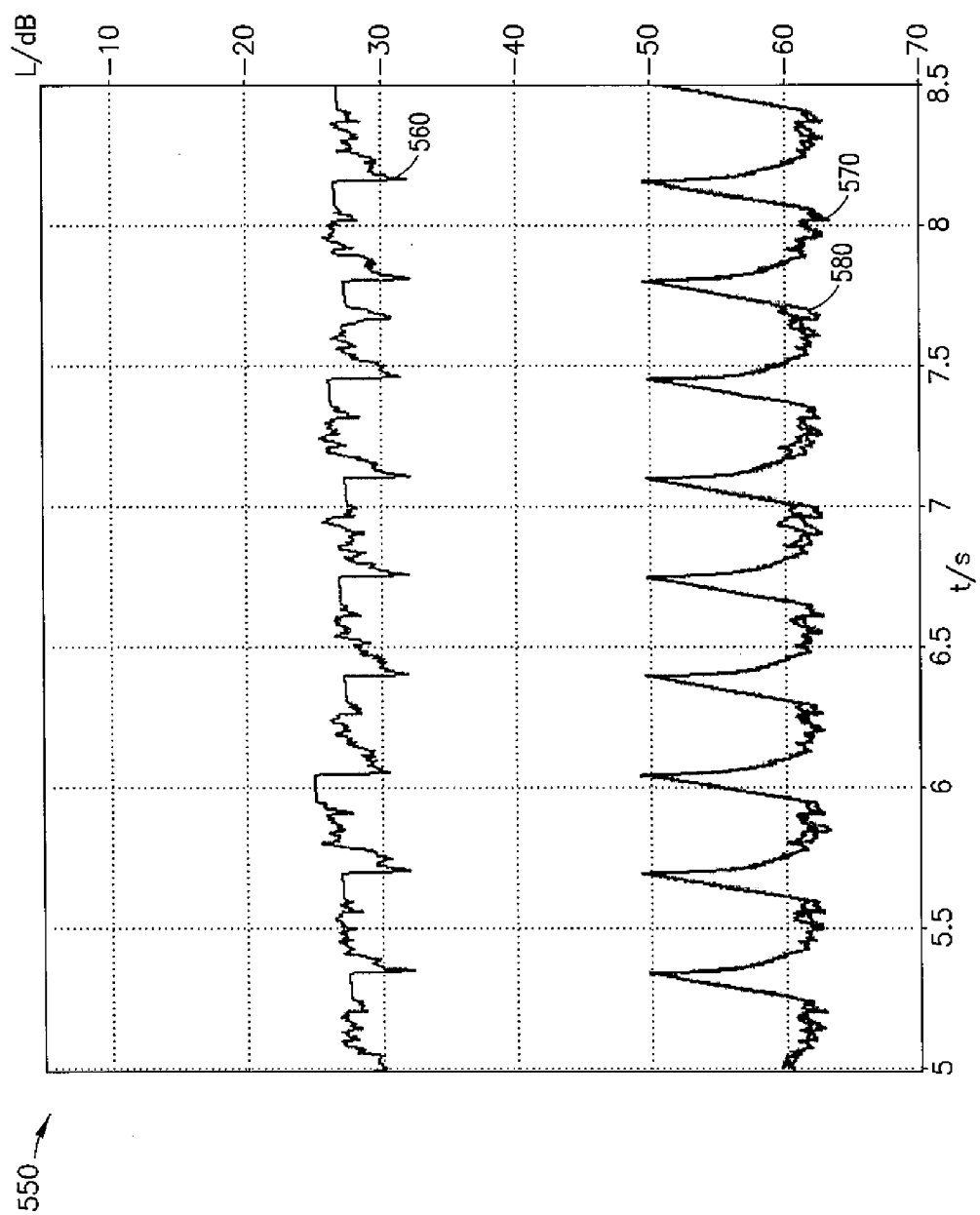
FIG. 16 is a graphical representation of echo level as a function of time.

Referring to FIG. 16, the echo level as a function of time at −16 dBm0 with echo cancellation tape is shown by a graph 550. Line 560 indicates the phone 100 having the acoustic echo controller (AEC) with background noise suppression (TX-ALWE) and UDRC OFF, line 570 indicates the phone 100 having AEC with the adaptive filter (AFIR) (suppressor OFF), and line 580 indicates the phone 100 having acoustic echo controller (AEC) with the adaptive filter (AFIR) (suppressor ON, 0 weights). The echo canceller performance is stable even when only the AEC adaptive filter is operative.

Figure 17:
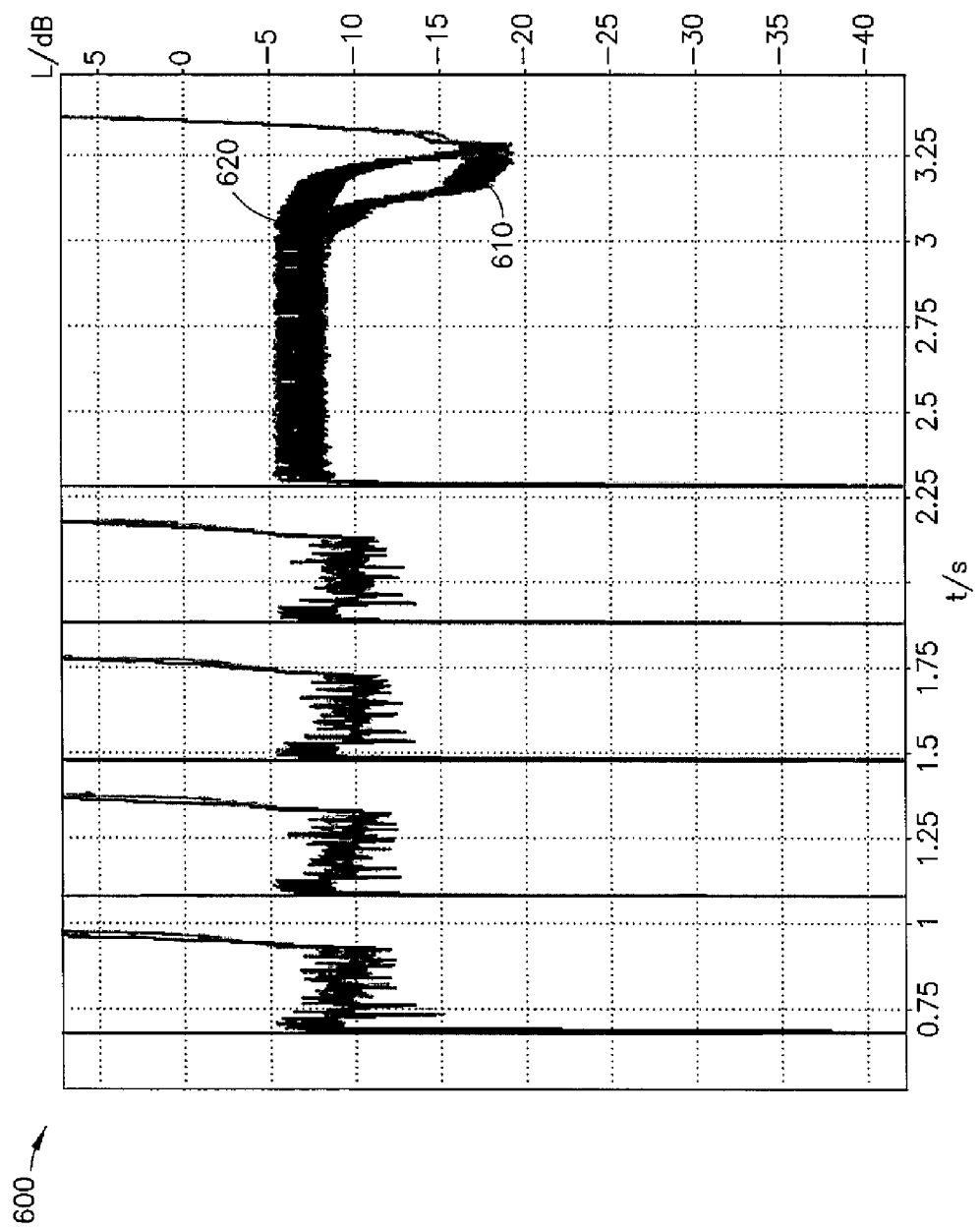
FIG. 17 is a graphical representation of uplink double talk attenuation for single and double talk recordings.

Referring to FIG. 17, an uplink double talk attenuation with echo cancellation tape is shown by a graph 600. Line 610 indicates a sound source with single talk recording, and line 620 indicates a sound source with double talk recording. As shown, for full duplex operation there is no uplink double talk attenuation.

Figure 18:
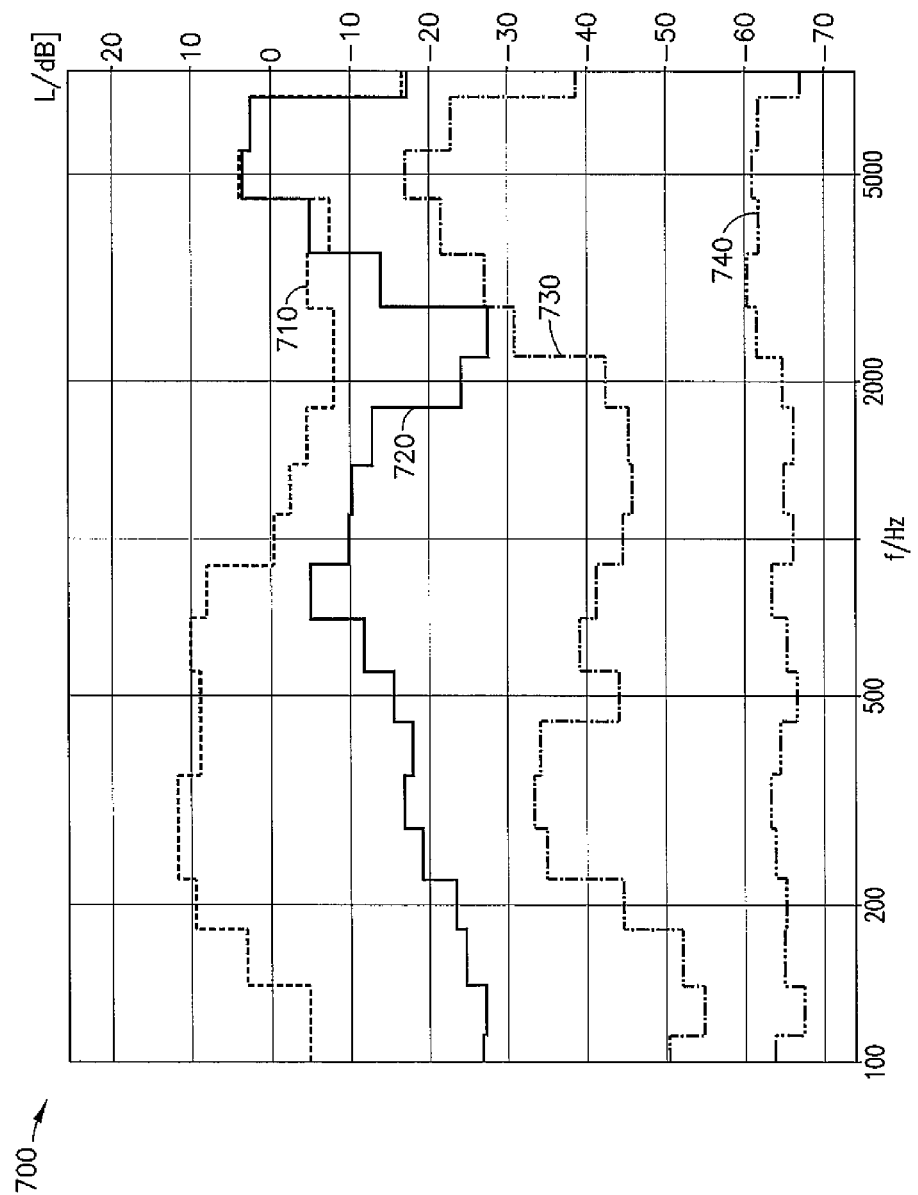
FIG. 18 is a graphical representation of a comparison of weighted terminal coupling loss for a mobile device having a polycarbonate unibody and a metal middle chassis.

Referring to FIG. 18, a comparison of TCLw for the phone 100 and a device having the polycarbonate unibody is shown by a graph 700. Line 710 indicates the polycarbonate unibody device having TX-ALWE and UDRC OFF, line 720 indicates the polycarbonate unibody device having an AFIR (suppressor OFF), line 730 indicates the phone 100 having AEC with TX-ALWE and UDRC OFF, and line 740 indicates the phone 100 having AEC having an AFIR (suppressor OFF). This graph shows that the echo level in the phone 100 without any echo cancellation software is improved over the echo level in the device having the polycarbonate unibody device with echo cancellation software.

Figure 19:
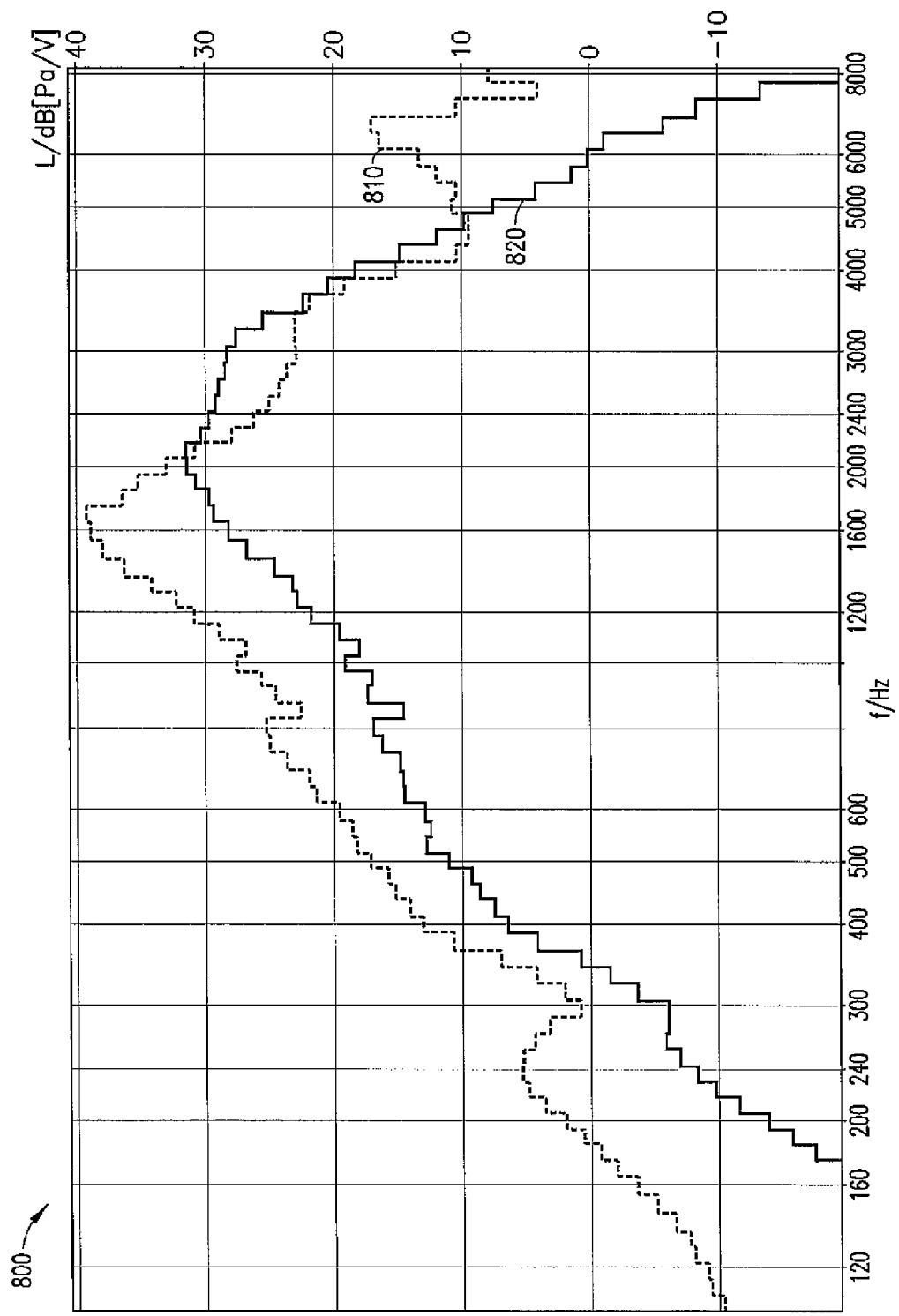
FIG. 19 is a graphical representation of untuned frequency responses of a device having a piezoelectric actuator versus an electromagnetic-based actuator.

Referring to FIG. 19, a comparison of frequency responses of a device having a piezoelectric actuator versus an electromagnetic-based actuator is shown by a graph 800. Line 810 indicates one exemplary embodiment of the phone 100 having a piezoelectric actuator at unequalized wide band RFR, and line 820 indicates one exemplary embodiment of the phone 100 having an electromagnetic actuator under the same conditions. The graph shows differences in the frequency response between the different embodiments of the phone 100. Each phone 100 includes a display 155 of OLED, and both actuators are located in similar positions. The digital gain setting for the piezoelectric actuator is −18 dB, and the digital gain setting for the electromagnetic actuator is −10 dB.

In any of the foregoing exemplary embodiments, the construction of the chassis 105 and ribs 135 with the display module 157 to define the panel speakers 165 provides several advantages. First, the industrial design of the panel speakers 165 is simple and lacks holes for the emission of sound, which means that ingress of water and/or dust into the phone 100 is limited. Second, the panel speakers 165 allow for more freedom with regard to placement of the phone 100 against the user's ear. In other words, it is not required or even preferable that a user hold the phone so that a sound hole is centered on the user's ear.

Any of the foregoing exemplary embodiments may be implemented in software, hardware, application logic, or a combination of software, hardware, and application logic. The software, application logic, and/or hardware may reside in the phone 100 (or other device). If desired, all or part of the software, application logic, and/or hardware may reside at any other suitable location. In an example embodiment, the application logic, software, or an instruction set is maintained on any one of various conventional computer-readable media. A "computer-readable medium" may be any media or means that can contain, store, communicate, propagate, or transport instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

In one exemplary embodiment, an apparatus comprises a first portion configured to carry one or more components of the apparatus and at least one wall extending between two or more sides of the first portion; an actuator located in the first portion adjacent to the at least one wall; and a movable section on the first portion and configured to be actuated by the actuator. At least the first portion and the movable section define a speaker.

The apparatus may further comprise a front window over the movable section and through which a user can interact with the apparatus. The movable section may comprise an organic light emitting diode display. The apparatus may comprise a flexible suspension between at least a portion of a peripheral edge of the movable section and a second portion of the apparatus. The second portion may comprise a side band, a unibody, a cover, or the like. It is also possible to connect the suspension between an interface section and the display window or display module. The interface section could frame the display window or display module. The apparatus may further comprise an echo cancellation tape between the movable section and the first portion. The apparatus may further comprise a shield plate mounted within the first portion and integral with the at least one wall. The actuator may be mounted to opposing edges of an opening in the shield plate. The first portion of the apparatus may be fabricated from one or more of aluminum, aluminum alloy, stainless steel, magnesium, magnesium alloy, titanium, titanium alloy, carbon fiber composite, and ceramic. The actuator may be a piezoelectric actuator, which may be configured to generate a force of about 0.2 N to about 1 N directed into the movable section. The actuator may be centrally located in an upper half of the first portion. The at least one wall may be positioned adjacent to the actuator. The at least one wall may extend between opposing sides of the first portion. A second wall of the at least one wall may extend perpendicular to a first wall of the at least one wall, and the second wall may cross the first wall adjacent to the actuator. The at least one wall may be configured to direct audio signals within the first portion, and the configuration to direct audio signals within the first portion may contribute to flattening of a frequency response. A space may be defined between a top surface of the at least one wall and a back cover located on a back of the first portion. A height of the at least one wall may be variable over a length of the at least one wall.

In another exemplary embodiment, a method comprises inputting data into a movable section of a mobile device; causing the operation of a controller having a memory and a processor; communicating with a means for receiving a downlink audio signal; and providing the downlink audio signal through a first portion carrying one or more components and at least one wall extending between two or more sides of the first portion.

The method may further comprise processing the downlink audio signal prior to providing the downlink audio signal through the at least one wall to the movable section. The movable section of the mobile device may define a portion of a panel speaker.

In another exemplary aspect, a non-transitory computer readable storage medium comprises one or more sequences of one or more instructions which, when executed by one or more processors of an apparatus, causes the apparatus to at least: communicate with a means for receiving a downlink audio signal; and provide the downlink audio signal through a first portion carrying one or more components and at least one wall extending between two or more sides of the first portion to a user.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications, and variances which fall within the scope of the appended claims.

What is claimed is:

1. An apparatus, comprising:
    a first portion on which one or more components of the apparatus may be located, the first portion comprising two opposing long side edges and two opposing short side edges, and having at least one first wall, at least one second wall, and at least one, third wall protruding from the first portion;
    a piezoelectric actuator located on the first portion adjacent to the at least one first wall and adjacent to the at least one second wall; and a movable section configured to be actuated by the piezoelectric actuator;

wherein at least the first portion and the movable section define a speaker;

wherein the at least one first wall extends perpendicularly to the two opposing long side edges from a first point between opposing ends of a first of the two opposing long side edges across the first portion to a second point between opposing ends of a second of the two opposing long side edges, wherein the at least one second wall extends substantially perpendicularly to the two opposing short side edges from a first point between opposing ends of a first of the two opposing short sides across the first portion to the first wall, wherein the at least one third wall extends substantially perpendicularly to the two opposing short side edges from a first point between opposing ends of a second of the two opposing short sides across the first portion to the first wall, and wherein the at least one second wall and the at least one third wall are not aligned;

wherein the at least one first wall is configured to at least one of
facilitate one or more of enhancing a low frequency response of sound output from the movable section and smoothing a high frequency response of sound output from the movable section and
inhibit a variation in at least one of the low frequency response and the high frequency response by user contact on at least the two opposing long side edges; and wherein the at least one second wall and the at least one third wall are configured to inhibit resonance in the first portion and attenuate vibrations in the movable section.

2. The apparatus of claim 1, further comprising a front window over the movable section and through which a user can interact with the apparatus.

3. The apparatus of claim 1, wherein the movable section comprises an organic light emitting diode display.

4. The apparatus of claim 1, further comprising a flexible suspension between at least a portion of a peripheral edge of the movable section and a second portion of the apparatus.

5. The apparatus of claim 1, further comprising an echo cancellation tape between the movable section and the first portion.

6. The apparatus of claim 1, further comprising a shield plate mounted within the first portion and integral with the at least one first wall.

7. The apparatus of claim 1, wherein the first portion is fabricated from one or more of aluminum, aluminum alloy, stainless steel, magnesium, magnesium alloy, titanium, titanium alloy, carbon fiber composite, and ceramic.

8. The apparatus of claim 1, wherein the piezoelectric actuator is configured to generate a force of 0.2 N to 1 N directed to the movable section.

9. The apparatus of claim 1, wherein the piezoelectric actuator is centrally located in an upper half of the first portion.

10. The apparatus of claim 1, wherein the at least one first wall is configured to direct audio signals within the first portion.

11. The apparatus of claim 10, wherein the configuration to direct audio signals within the first portion contributes to flattening of a frequency response.

12. The apparatus of claim 1, wherein a space is defined between a top surface of the at least one first wall and a back cover located on a back of the first portion.

13. The apparatus of claim 1, wherein a height of the at least one wall is variable over a length of the at least one first wall.

14. The apparatus of claim 1, wherein the at least one first wall is configured to improve a low frequency response of an audio output, and wherein the at least one second wall is configured to improve a high frequency response of the audio output.

15. A method, comprising:
inputting data into a movable section of a mobile device;
causing the operation of a controller having a memory and a processor;
communicating with a means for receiving a downlink audio signal; and
providing the downlink audio signal through a first portion of the mobile device on which one or more components may be located, the first portion comprising two opposing long side edges and two opposing short side edges and having at least one first wall, at least one second wall, and at least one third wall;
wherein the at least one first wall extends perpendicularly to the two opposing long side edges from a first point between opposing ends of a first of the two opposing long side edges across the first portion to a second point between opposing ends of a second of the two opposing long side edges, wherein the at least one second wall extends substantially perpendicularly to the two opposing short side edges from a first point between opposing ends of a first of the two opposing short sides across the first portion to the first wall, wherein the at least one third wall extends substantially perpendicularly to the two opposing short side edges from a first point between opposing ends of a second of the two opposing short sides across the first portion to the first wall, and wherein the at least one second wall and the at least one third wall are not aligned;
wherein the at least one first wall is configured to at least one of
facilitate one or more of enhancing a low frequency response of sound output from the movable section and smoothing a high frequency response of sound output from the movable section; and
inhibit a variation in at least one of the low frequency response and the high frequency response by user contact on at least the two opposing long side edges; and
wherein the at least one second wall and the at least one third wall are configured to inhibit resonance in the first portion and attenuate vibrations in the movable section.

16. The method of claim 15, further comprising processing the downlink audio signal prior to providing the downlink audio signal through the at least one first wall to the movable section.

17. The method of claim 16, wherein the movable section of the mobile device may define a portion of a panel speaker.

* * * * *